(12) United States Patent
McGuffin

(10) Patent No.: US 11,149,904 B1
(45) Date of Patent: Oct. 19, 2021

(54) HOLDER APPARATUS AND METHOD

(71) Applicant: Thomas R. McGuffin, Daphne, AL (US)

(72) Inventor: Thomas R. McGuffin, Daphne, AL (US)

( * ) Notice: Subject to any disclaimer, the term of this patent is extended or adjusted under 35 U.S.C. 154(b) by 22 days.

(21) Appl. No.: 16/744,381

(22) Filed: Jan. 16, 2020

Related U.S. Application Data

(60) Provisional application No. 62/793,106, filed on Jan. 16, 2019.

(51) Int. Cl.
| | | |
|---|---|---|
| *A01K 97/00* | (2006.01) | |
| *F16M 13/02* | (2006.01) | |
| *A01K 97/10* | (2006.01) | |
| *A01K 97/22* | (2006.01) | |

(52) U.S. Cl.
CPC .......... *F16M 13/022* (2013.01); *A01K 97/00* (2013.01); *A01K 97/10* (2013.01); *A01K 97/22* (2013.01)

(58) Field of Classification Search
CPC ......... A01K 97/00; A01K 97/10; A01K 97/22
USPC ..... 211/85.7, 70.1, 70.8, 72, 85.21; 43/54.1; 248/535, 152, 314
See application file for complete search history.

(56) References Cited

U.S. PATENT DOCUMENTS

| | | | | |
|---|---|---|---|---|
| 5,005,847 A * | 4/1991 | King | ........................ | B62B 1/12 280/47.19 |
| 5,836,446 A * | 11/1998 | Varnom | ................. | B25H 3/026 206/373 |
| 5,901,890 A * | 5/1999 | Stokes | ..................... | B63B 21/56 224/406 |
| 6,681,517 B1 * | 1/2004 | Solomon | ................ | A01K 97/10 43/21.2 |
| 7,937,883 B2 * | 5/2011 | Roemer | ................. | A01K 97/08 43/21.2 |
| 8,919,262 B2 * | 12/2014 | Daniel, IV | ............. | A47B 37/00 108/44 |
| 9,253,970 B2 * | 2/2016 | Carnevali | ............. | H01F 7/0257 |
| 9,861,087 B1 * | 1/2018 | Arrazola | .............. | A47B 81/005 |
| 10,172,340 B2 * | 1/2019 | Bernardini | ............. | A01K 97/08 |
| 10,309,097 B2 * | 6/2019 | Hill | ........................ | A47G 7/045 |
| 10,568,312 B2 * | 2/2020 | McPherson | ............ | A01K 97/10 |
| 10,918,098 B2 * | 2/2021 | Morehead | .............. | A47C 7/622 |
| 2005/0039377 A1 * | 2/2005 | Clary | ..................... | A01K 97/06 43/54.1 |
| 2005/0235552 A1 * | 10/2005 | Gibson | .................. | A01K 97/08 43/54.1 |
| 2006/0124258 A1 * | 6/2006 | Zikos | ..................... | A01K 97/10 162/30.1 |
| 2007/0283614 A1 * | 12/2007 | Kessler | .................. | A01K 97/10 43/54.1 |
| 2009/0139132 A1 * | 6/2009 | Knight | ................... | A01K 97/06 43/54.1 |

(Continued)

*Primary Examiner* — Bradley Duckworth
(74) *Attorney, Agent, or Firm* — J. Nevin Shaffer, Jr.

(57) ABSTRACT

An improved holder includes a first plate with a front and a back where the first plate includes a container cut out conformed to receive a container. A second plate, with a front and a back, where the second plate includes a secondary cut out, is connected to the first plate below the first plate. A post receiving tube with an open end is connected to the second plate where the open end of the post receiving tube is configured to fit over and receive at least part of a post such that the improved holder apparatus is suspended from the post.

20 Claims, 8 Drawing Sheets

(56) References Cited

U.S. PATENT DOCUMENTS

| | | | |
|---|---|---|---|
| 2015/0208634 A1* | 7/2015 | Box | A01K 97/10 |
| | | | 108/25 |
| 2017/0245486 A1* | 8/2017 | Larson | B65D 25/28 |
| 2018/0146655 A1* | 5/2018 | Crossen | A01K 97/06 |
| 2019/0364867 A1* | 12/2019 | Zeiske | A01K 97/08 |
| 2020/0093111 A1* | 3/2020 | Fryar | B63B 34/20 |

* cited by examiner

HOLDER APPARATUS AND METHOD

CROSS REFERENCE TO RELATED APPLICATION

This application claims the benefit of previously filed U.S. provisional patent application No. 62/793,106 filed 16 Jan. 2019 for an "Improved Bucket Holder Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to an improved holder apparatus and method. According to a preferred embodiment, the improved holder of the present invention includes a first plate with a front and a back where the first plate includes a container cut out conformed to receive a container. A second plate, with a front and a back, where the second plate includes a secondary cut out and is connected to the first plate below the first plate. A post receiving tube with an open end is connected to the second plate where the open end of the post receiving tube is configured to fit over and receive at least part of a post such that the improved holder apparatus is suspended from the post.

BACKGROUND OF THE INVENTION

By way of example only and not by limitation, fishing is hard. It is particularly hard since the platform for doing so is often moving, sometimes a lot. All fishermen, more especially physically challenged individuals, have problems with accessing live bait buckets in fishing vessels. Extra space is at a premium, especially on smaller vessels under twenty-five feet in length, so locations for placing bait buckets is difficult to find such that the buckets usually are placed at a user's feet and it is common that bait buckets turn over and live bait dies and/or is lost overboard.

Thus, there is a need in the art for a device that addresses the aforementioned problems in a manner that is robust and flexible so as to accommodate a full spectrum of vehicle, boat, trailer, and the like, shapes and dimensions and that prevents buckets, coolers and other "holders" from over-turning. Further there is a need for a device that accommodates the location and retention in nearby relation to the user that are also useful to a fisherman, hunter, traveler, etc. Such items including, for example only and not by way of limitation, umbrellas, pliers, fishing rod holders, knives, ammunition and the like.

It therefore is an object of this invention to provide an improved holder apparatus and method for increasing the security of and access to a bait bucket and other useful items that is easy to use and economical to install and operate.

SUMMARY

Accordingly, an improved holder apparatus and method according to a preferred embodiment consists of a first plate with a front and a back where the first plate includes a container cut out conformed to receive a container. A second plate, with a front and a back, where the second plate includes a secondary cut out and is connected to the first plate below the first plate. A post receiving tube with an open end is connected to the second plate where the open end of the post receiving tube is configured to fit over and receive at least part of a post such that the improved holder apparatus is suspended from the post.

In one aspect, a support is connected to the first plate below the container cut out and is conformed to support the bottom of a container.

In one aspect, the first plate and the second plate are connected by a middle connection plate with at top edge and a bottom edge where the back of the first plate is connected to one side of the middle connection plate and where the back of the second plate is connected to the other side of the middle connection plate such that the front of the first plate faces away from the front of the second plate.

In another aspect, the first plate is connected to the top edge of the middle connection plate on one side of the middle connection plate and where the second plate is connected to the bottom edge of the middle connection plate on the other side of the middle connection plate.

In one aspect, the container is a bucket and in another aspect, the container is a cooler.

In another aspect, the apparatus further includes more than one secondary cut out in the first plate.

In another aspect, the apparatus further includes a cylinder configured to receive and retain an object and in one aspect, the cylinder is configured to receive an object selected from a group of objects consisting of: a chair, an umbrella, a fishing pole, and pliers.

According to another embodiment, an improved holder apparatus consists of a first plate with a front and a back where the first plate includes a container cut out conformed to receive a container where the first plate includes a pair of secondary cut outs, one on one side of the first plate and one on the other side of the first plate, and a pair of cylinders. A second plate, with a front and a back, includes a secondary cut out and is connected to the first plate below the first plate. A post receiving tube, with an open end, is connected to the second plate and is configured to fit over and receive at least part of a post such that the improved holder apparatus is suspended from the post.

In one aspect, the first plate and the second plate are connected by a middle connection plate with at top edge and a bottom edge where the back of the first plate is connected to one side of the middle connection plate and where the back of the second plate is connected to the other side of the middle connection plate such that the front of the first plate faces away from the front of the second plate.

In another aspect, the first plate is connected to the top edge of the middle connection plate on one side of the middle connection plate and where the second plate is connected to the bottom edge of the middle connection plate on the other side of the middle connection plate.

In a further aspect, the middle connection plate includes adjustment slots such the location of the first plate and the second plate on the middle connection plate is adjustable.

In one aspect, the middle connection plate includes horizontal adjustment slots and vertical adjustment slots.

In a further aspect, the pair of cylinders on the first plate are connected with the first plate with one on one side of the container cut out and one on the other side of the container cut out and where the pair of cylinders are configured to receive chair supports.

In one aspect, the container is a bucket in another aspect, the container is a cooler.

In one aspect, the pair of secondary cut outs and the pair of cylinders are configured to receive an object selected from a group of objects consisting of: a chair, an umbrella, a fishing pole, and pliers.

According to another embodiment, an improved holder method consists of:

a.) providing a first plate with a front and a back where the first plate includes a container cut out conformed to receive a container; a second plate with a front and a back where the second plate includes a secondary cut out and is connected to the first plate below the first plate; and a post receiving tube with an open end connected to the second plate where the open end of the post receiving tube is configured to fit over and receive at least part of a post such that the improved holder apparatus is suspended from the post; and b.) placing the post receiving tube open end over a post.

In another aspect, the method further includes placing a container in the first plate container cut.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
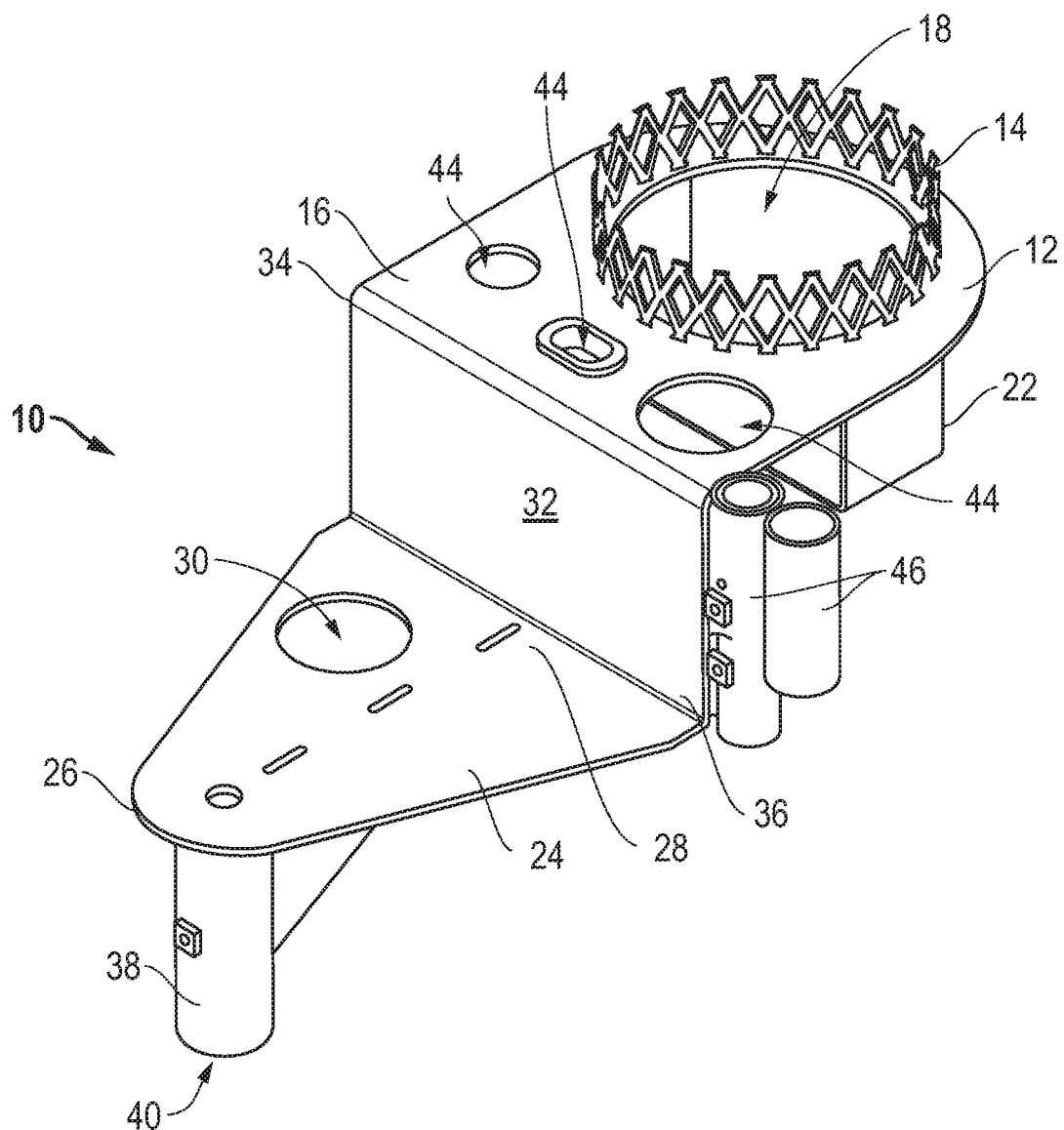
FIG. 1 is a perspective view of the improved bucket holder of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
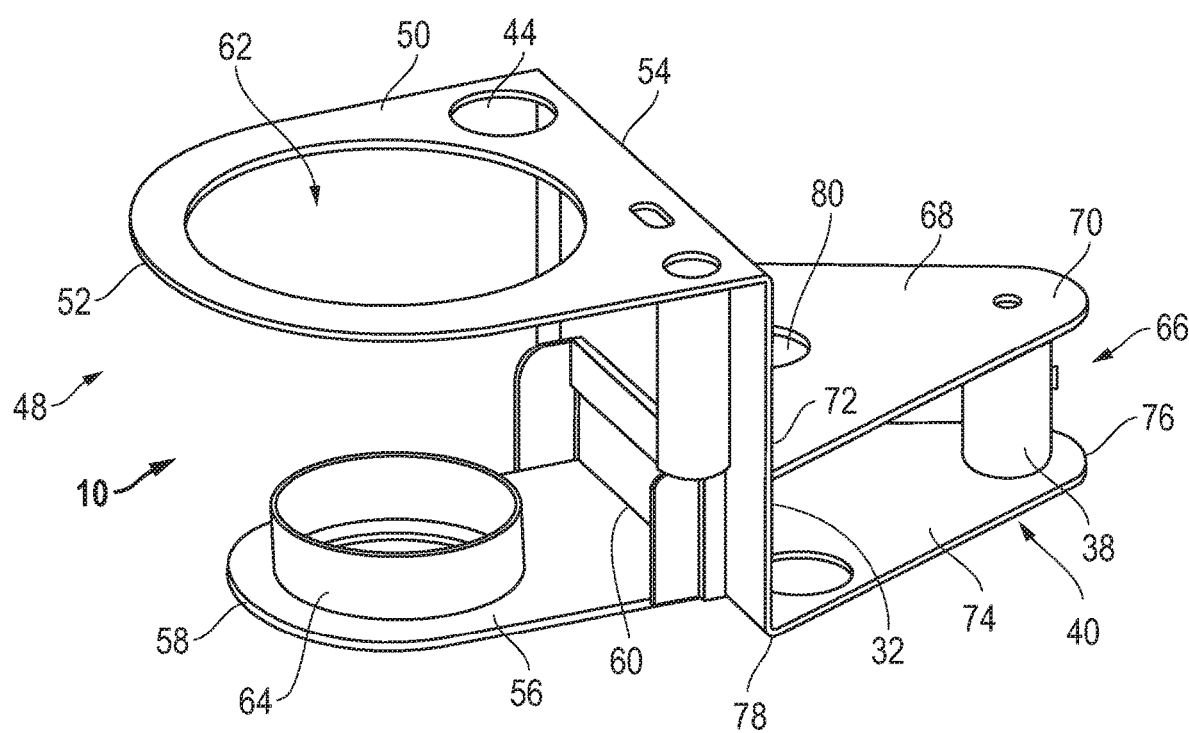
FIG. 2 is a perspective view of the invention of FIG. 1 with a second pair of spaced apart plates.
Figure 3:
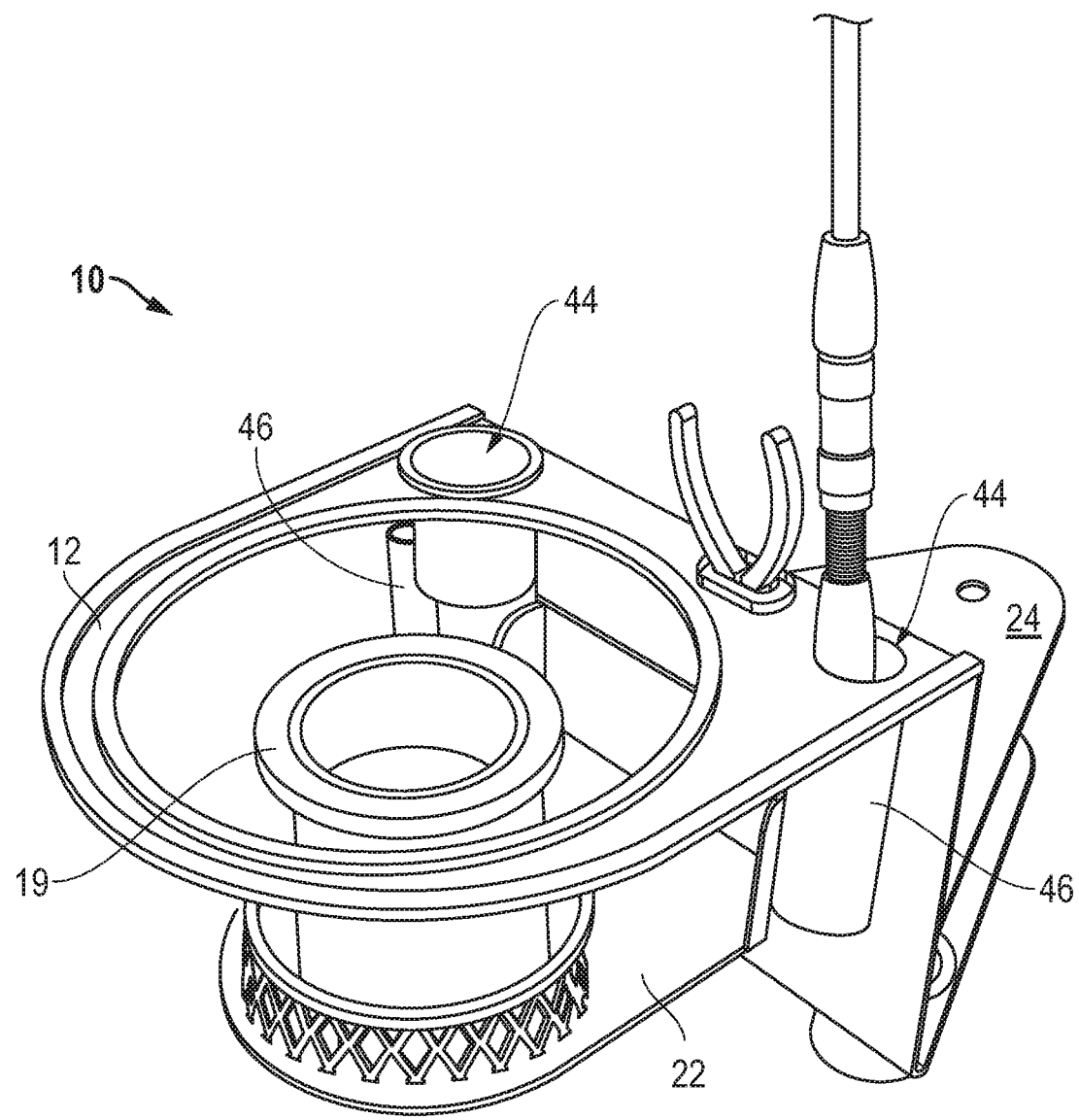
FIG. 3 is a perspective view of the invention of FIG. 1 supporting a small bait bucket, an umbrella, a pair of pliers and a fishing rod.
Figure 4:
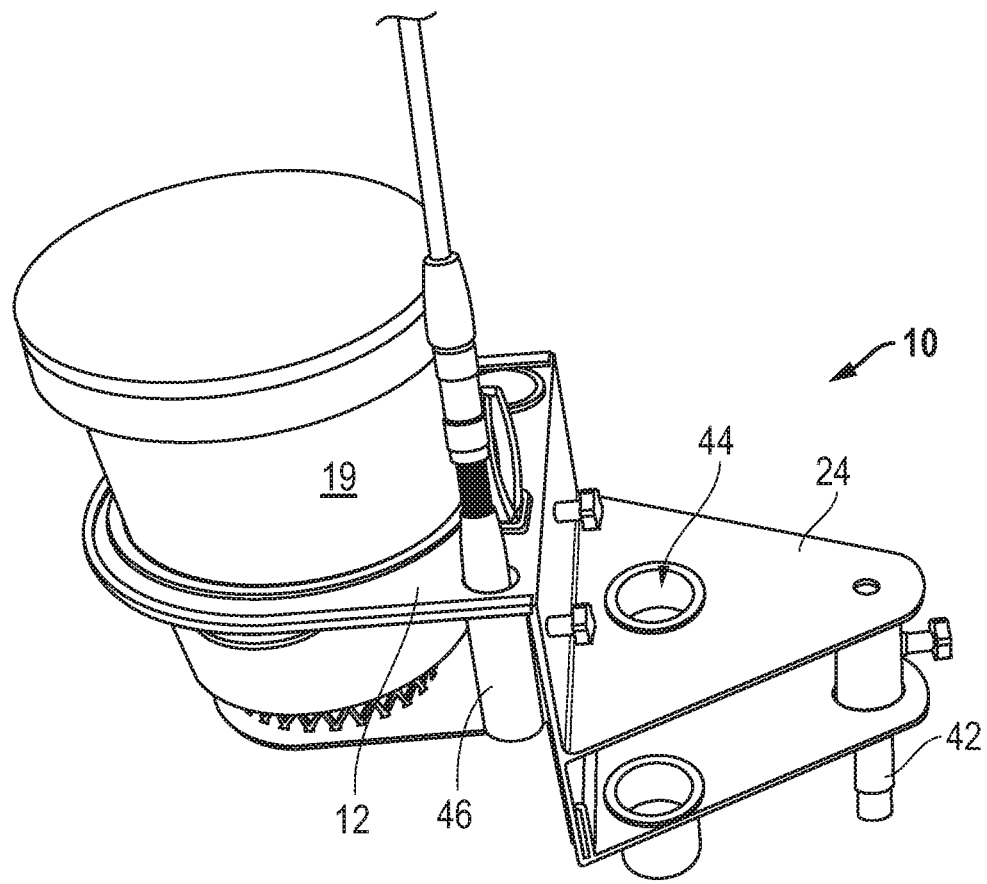
FIG. 4 is a perspective view of the invention of FIG. 2 supporting a large bait bucket, an umbrella, a pair of pliers and a fishing rod.

One embodiment of the present invention is illustrated by way of example in FIGS. 1-8. Referring to FIG. 1, the improved holder 10 of the present invention includes a first plate 12 with a front 14 and a back 16 where the first plate 12 includes a cut out 18 conformed to receive a container 20 (see FIGS. 3 and 4). In one embodiment the container is a bucket 19 as shown in FIG. 4 and in another aspect the container is a cooler 21 as shown in dotted lines FIG. 7. Certainly any device for holding material is within the scope of the invention as disclosed.

A support 22 is connected to the first plate 12 below the cut out 18 and is conformed to support the base or bottom of a container 20. Where the top of a container 20 is wider than the container cut out 18, there may be no need for support 22.

A second plate 24 with a front 26 and a back 28 is provided where the second plate 24 includes a secondary cut out 30. In this embodiment, a middle connection plate 32, with at top edge 34 and a bottom edge 36, is provided where the back 16 of the first plate 12 is connected to the middle connection plate 32 on one side and where the back 28 of the second plate 24 is connected to the other side of the middle connection plate 32 such that the front 14 of the first plate 12 faces away from the front 26 of the second plate 24. A post receiving tube 38, with an open end 40, is connected to the second plate 24 where the open end 40 of the post receiving tube 38 is configured to fit over and receive at least part of a post 42 (see FIG. 4) such that the improved bucket holder apparatus 10 is suspended from the post 42.

As shown in FIG. 1, the structure may include other secondary cut outs 30 such as cut outs 44 and attached cylinders 46 for the purpose of holding umbrellas, pliers, fishing rods, or any other item deemed useful to the user as illustrated in FIGS. 3 and 4, for example only and not by way of limitation.

In one aspect, the first plate 12 is connected to the top edge 34 of the middle connection plate 32 on one side of middle connection plate 32 and the second plate 24 is connected to the bottom edge 36 of the middle connection plate 32 on the other side of middle connection plate. Certainly, any useful location for connection is within the scope of the invention.

Referring now to FIG. 2, according to another more particular embodiment, an improved holder apparatus 10 consists of a first pair of spaced apart plates 48 with a first upper plate 50 with a front 52 and a back 54 and a first lower plate 56 with a front 58 and a back 60 where the first upper plate 50 includes a container cut out 62 conformed to receive a container 20 and where the first lower plate 56 includes a receiver 64 conformed to support a container 20. A second pair of spaced apart plates 66 is provided with a second upper plate 68, with a front 70 and a back 72, and a second lower plate 74 with a front 76 and a back 78 where at least the second upper plate 68 includes a secondary cut out 80. In this embodiment, a middle connection plate 32 is provided where the back, 54 and 60, of the first pair of spaced apart plates 48 is connected to one side of the middle connection plate 32 and where the back, 72 and 78, of the second pair of spaced apart plates 66 is connected to the other side of the middle connection plate 32 such that the front, 52 and 58, of the first pair of spaced apart plates 48 faces away from the front, 70 and 76, of the second pair of spaced apart plates 66. This particular structure acts to extend the container 20 away from the post receiving tube 38 and allows the apparatus to rotate around post 42 to various positions making access to the container 20 more convenient. Again, post receiving tube 38, with an open end 40, is connected between the first ends, 70 and 76, of the second pair of spaced apart plates 66 where the open end 40 of the post receiving tube 38 is configured to fit over and receive at least part of a post 42 such that the improved holder apparatus is suspended from the post 42 as described above and illustrated.

FIGS. 3 and 4 illustrate the use of the invention with a small bait bucket 19 (FIG. 3) and a large bait bucket 19 (FIG. 4) as well as illustrating the use of additional secondary cut outs 30 and cut outs 44 and cylinders 46 to hold pliers, fishing rods and umbrellas for example only.

Figure 5:
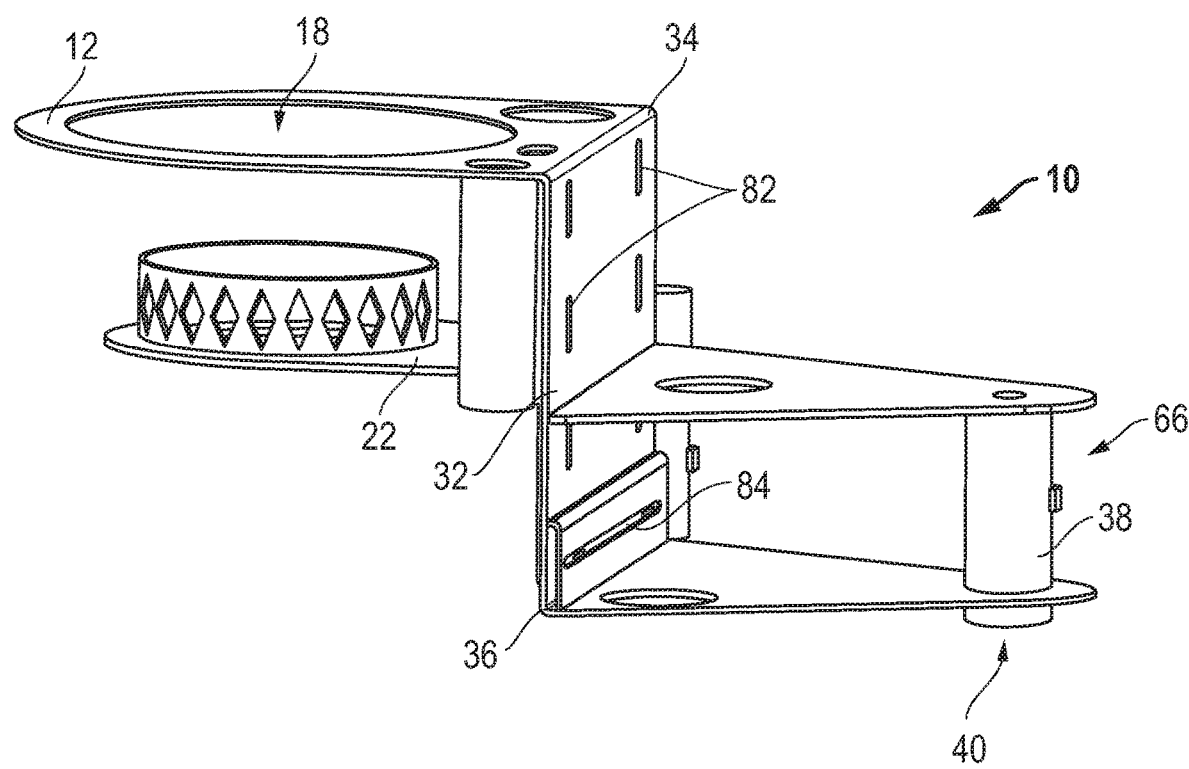
FIG. 5 is a side perspective view of the invention of FIG. 2 illustrating vertical and horizontal adjustment slots.

Referring now to FIG. 5, all the elements of the invention are as described above, in particular with regard to the embodiment of FIG. 2, FIG. 5 illustrates another structural element of the invention in the nature of enabling the parts of the invention to move relative to each other. By way of example only and not by limitation, vertical adjustment slots 82 may be provided in middle connection plate 32 so that the second pair of spaced apart plates 66 may be located nearer to the top edge 34 of middle connection plate 32 or farther apart as required by, for example, the size of the container 20 to be supported within the invention.

Further, horizontal adjustment slot 84 may be provided such that the second pair of spaced apart plates 66 may be located to the left or right of the center of middle connection plate 32 as required by, for example, the size of the container 20 to be supported within the invention or the convenience of the user. Certainly, any type of adjustment device now known or hereafter developed for effecting vertical and horizontal movement of the elements of the invention are well within the scope of the invention as described and illustrated.

Figure 6:
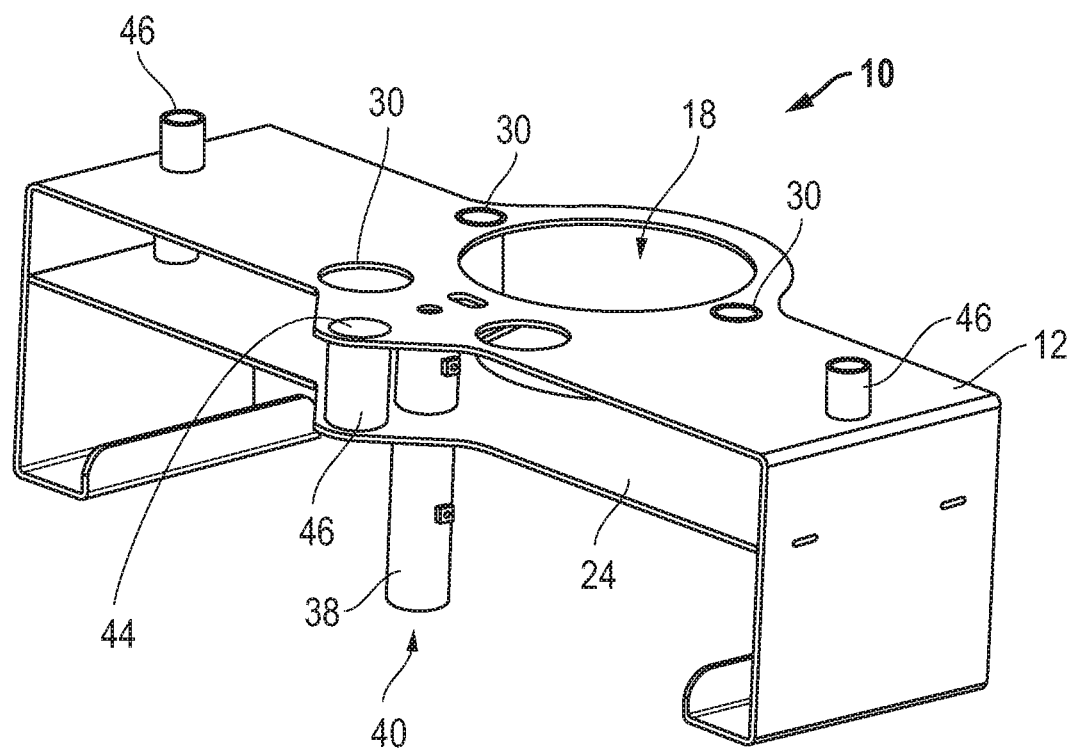
FIG. 6 is a perspective view of the invention without the middle connection plate.
Figure 7:
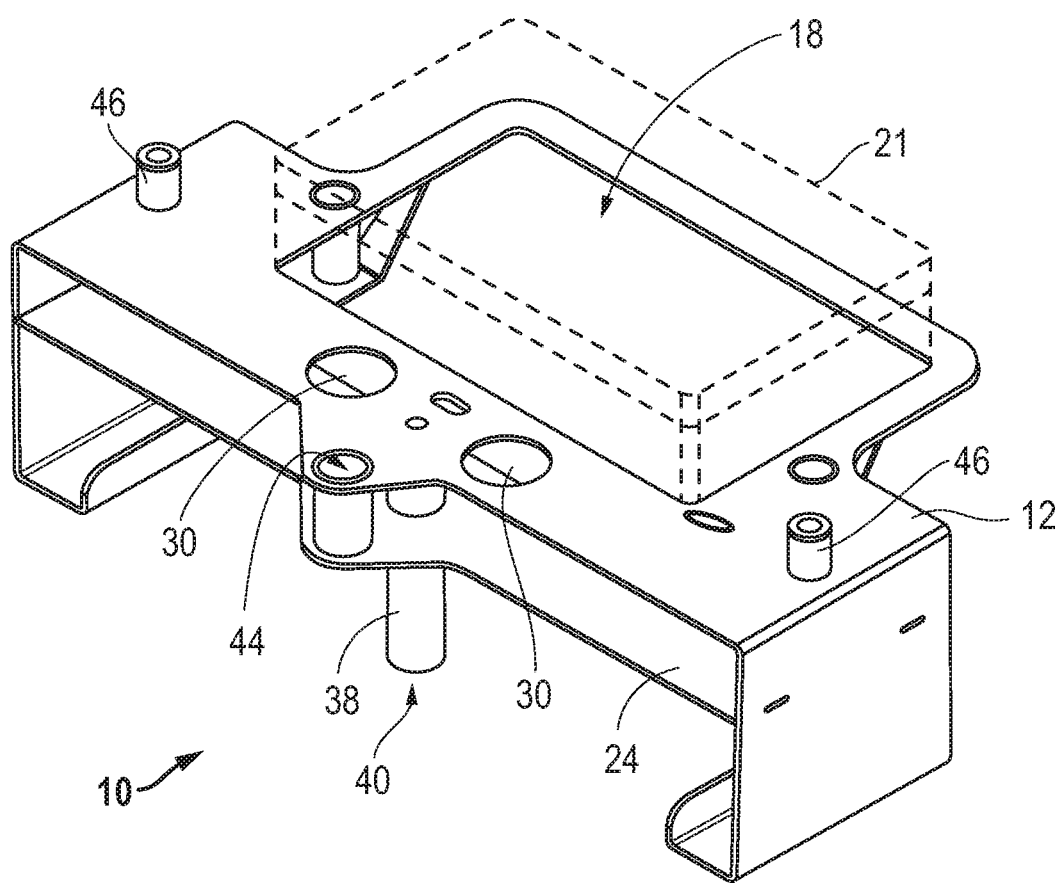
FIG. 7 is a perspective view of the invention of FIG. 6 configured to receive a cooler.
Figure 8:
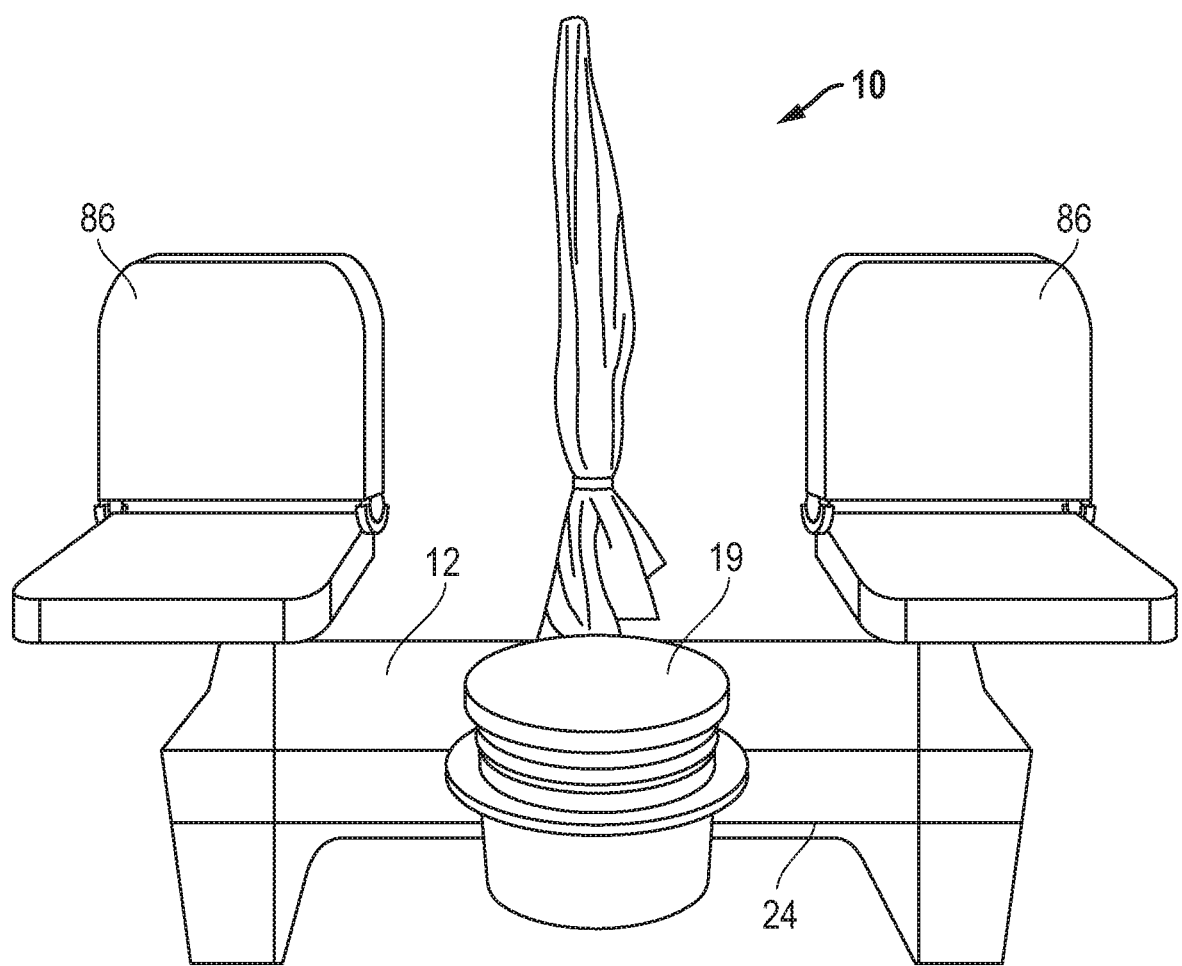
FIG. 8 is a front view of the invention of FIG. 6 with two chairs and a bucket.

FIGS. 6, 7 and 8 illustrate the present invention configured to support two chairs, one on either side of the container cutout 18. All the elements of the apparatus are as identified above and as shown in the figures such that FIGS. 6 and 8 show the invention with a cut out 18 configured to receive a bucket 19 while FIG. 7 shows the structure configured to receive a cooler 21 (shown in dotted lines).

Further, FIGS. 6 and 7 show the invention including a pair of cylinders 46 located on first plate 12, one on either side of container cut out 18. These cylinders 46 are configured to receive a post 42 (not shown) connected to the bottom of a chair 86 such that, as shown in FIG. 8, a pair of chairs 86 may be located next to container 20.

By way of additional description, all fishermen, more especially physically challenged individuals, have issues with accessibility to live bait buckets in fishing vessels as well as very, limited space on vessels under twenty-five feet. Another issue is bait buckets turning over and live bait dying. Applicant's invention is a unique in that it attaches directly to a seat post in either the front or the rear or both. The container, bucket, height is adjustable to accommodate specific needs, has the structure to hold useful items such as umbrellas, pliers, nets, drinks, tackle and rods in easily accessible location and installs quickly with no tools required. It can support a variety of sizes of bucket and cooler containers without adjustment. Applicant is aware of many types of devices used in the support of fishing with various types of bait and fishing equipment but none of the structure such as described herein that is adjustable and easy to use and install and remove and/or re-position. Certainly, the present invention may be used in other pursuits such as hunting where the structure will support ammunition holders for water fowlers and serving as adjustable storage platforms for multiple other applications.

Still further, in one aspect the invention is designed to accommodate two fishing anglers, sitting side by side with a live bait container in between for easy access. Preferably, the apparatus is constructed from solid aluminum plating and coated in various colors according to user preference.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A holder apparatus comprising:
   a.) a first plate with a front and a back wherein said first plate includes a container cut out conformed to receive a container;
   b.) a second plate with a front and a back wherein said second plate includes a secondary cut out and is connected to said first plate below the first plate wherein the first plate and the second plate are connected by a middle connection plate with a top edge and a bottom edge wherein the back of the first plate is connected to one side of the middle connection plate and wherein the back of the second plate is connected to the other side of the middle connection plate such that the front of the first plate faces away from the front of the second plate; and
   c.) a post receiving tube with an open end connected to the second plate wherein the open end of said post receiving tube is configured to fit over and receive at least part of a post such that said holder apparatus is suspended from said post.

2. The apparatus of claim 1 farther comprising a support connected to said first plate below said container cut out conformed to support a container.

3. The apparatus of claim 1 wherein the first plate is connected to the top edge of the middle connection plate on one side of the middle connection plate and wherein the second plate is connected to the bottom edge of the middle connection plate on the other side of the middle connection plate.

4. The apparatus of claim 1 wherein the container is a bucket.

5. The apparatus of claim 1 wherein the container is a cooler.

6. The apparatus of claim 1 further including more than one secondary cut out in said first plate.

7. The apparatus of claim 1 further including a cylinder configured to receive and retain an object.

8. The apparatus of claim 7 wherein said cylinder is configured to receive an object selected from a group of objects consisting of: a chair, an umbrella, a fishing pole, and pliers.

9. A holder apparatus comprising:
 a.) a first plate with a front and a back wherein said first plate includes a container cut out conformed to receive a container wherein the first plate includes a pair of secondary cut outs one on one side of the first plate and one on the other side of the first plate and a pair of cylinders;
 b.) a second plate with a front and a hack wherein said second plate includes a secondary cut out and is connected to said first plate below the first plate wherein the first plate and the second plate are connected by a middle connection plate with a top edge and a bottom edge wherein the back of the first plate is connected to one side of the middle connection plate and wherein the back of the second plate is connected to the other side of the middle connection plate such that the front of the first plate faces away from the front of the second plate; and
 c.) a post receiving, tube with an open end connected to the second plate wherein the open end of said post receiving tube is configured to fit over and receive at least part of a post such that said holder apparatus is suspended from said post.

10. The apparatus of claim 9 wherein the first plate is connected to the top edge of the middle connection plate on one side of the middle connection plate and wherein the second plate is connected to the bottom edge of the middle connection plate on the other side of the middle connection plate.

11. The apparatus of claim 9 wherein the middle connection plate includes adjustment slots such the location of the first plate and the second plate on said middle connection plate is adjustable.

12. The apparatus of claim 11 wherein the middle connection plate includes horizontal adjustment slots and vertical adjustment slots.

13. The apparatus of claim 9 wherein the pair of cylinders on said first plate are connected with the first plate with one on one side of the container cut out and one on the other side of the container cut out and wherein the pair of cylinders are configured to receive chair supports.

14. The apparatus of claim 9 wherein the container is a bucket.

15. The apparatus of claim 9 wherein the container is a cooler.

16. The apparatus of claim 9 wherein said pair of secondary cut outs and said pair of cylinders are configured to receive an object selected from a group of objects consisting of: a chair, an umbrella, a fishing pole, and pliers.

17. A holder method consisting of:
 a.) providing a first plate with a front and a back wherein said first plate includes a container cut out conformed to receive a container; a second plate with a front and a back wherein said second plate includes a secondary cut out and is connected to said first plate below the first plate wherein the first plate and the second plate are connected by a middle connection plate with a top edge and a bottom edge wherein the back of the first plate is connected to one side of the middle connection plate and wherein the back of the second plate is connected to the other side of the middle connection plate such that the front of the first plate faces away from the front of the second plate; and a post receiving tube with an open end connected to the second plate wherein the open end of said post receiving tube is configured to fit over and receive at least part of a post such that said holder is suspended from said post; and
 b.) placing the post receiving tube open end over a post.

18. The method of claim 17 further including placing a container in the first plate container cut out.

19. The method of claim 18 wherein the container is a bucket.

20. The method of claim 18 wherein the container is a cooler.

\* \* \* \* \*